March 18, 1952     F. C. THOMPSON     2,589,584
RADAR NAVIGATING APPARATUS FOR AIRCRAFT
Filed July 31, 1947     2 SHEETS—SHEET 1

F. C. Thompson
*Inventor*

By *[signature]*
*Attorney*

Patented Mar. 18, 1952

2,589,584

UNITED STATES PATENT OFFICE 2,589,584

RADAR NAVIGATING APPARATUS FOR AIRCRAFT

Frederick Charles Thompson, Danbury, England

Application July 31, 1947, Serial No. 764,938
In Great Britain October 15, 1945

Section 1, Public Law 690, August 8, 1946
Patent expires October 15, 1965

5 Claims. (Cl. 343—5)

This invention relates to improvements in navigating apparatus of the kind in which the terrain being navigated is scanned by a pulse-modulated radio beam and echoes of the pulses are displayed on a cathode ray tube in a manner such as to present a map-like picture of said terrain. A cathode ray tube employed in this manner is known as a plan position indicator.

The display at any instant represents an area of the terrain located in some definite relationship to the position of the craft and is usually a circular area centered at or vertically below the craft. Consequently, as the craft moves the area portrayed is continually shifting and the display appears to drift across the screen at a rate which is proportional to the ground speed of the craft. With the display drifting in this fashion it is sometimes difficult to identify small features, particularly as they drift towards the centre of the screen where the definition may fall off to a considerable extent. In fact small features sometimes completely lose their identity at short ranges.

Objects of the present invention are to overcome the above described disadvantages which accrue from the drift of the display, particularly if there is a lack of definition at the centre, and also to provide a ready means of determining the ground speed and track of the craft.

According to the invention means are provided for arresting the drift of the display for a predetermined maximum time. The display is arranged to represent only a fraction of the total area of terrain scanned by the pulse-modulated radio beam and the maximum time of stabilisation is necessarily limited to the time taken for the smaller area to drift to the boundaries of the larger area.

Figure 1:
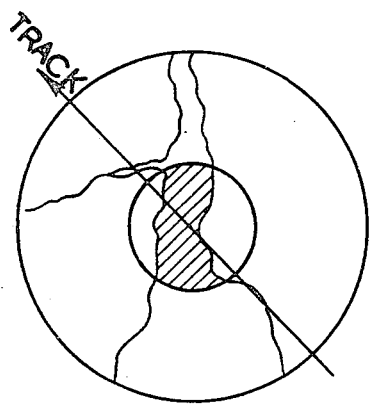
Figures 1 to 4 illustrate the relation of certain radar displays to the terrain including and surrounding the display.
Figure 2:
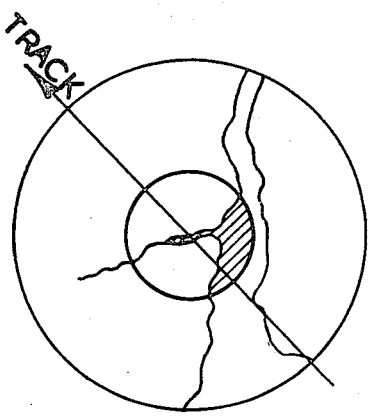
Figure 3:
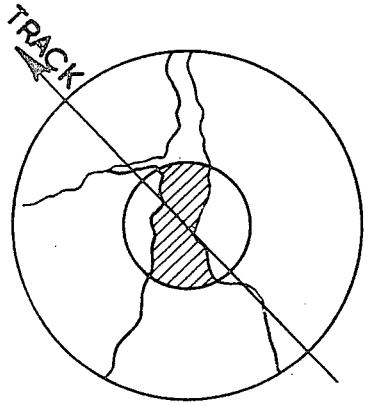
Figure 4:
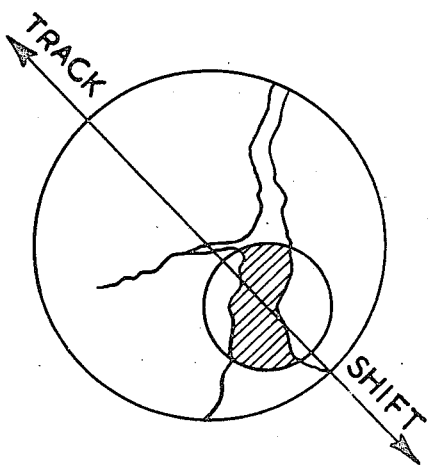

Referring to Figures 1 to 4 of the accompanying drawings, in Figure 1 the boundary of the larger circle represents an area scanned by the radio beam from radar apparatus in an aircraft and within it are shown some typical geographical features. The smaller circle represents the area covered by the display on the cathode ray tube at one instant. The aircraft is tracking say south-east to north-west and hence at some later instant the display has drifted and is as shown within the smaller circle of Figure 2. According to the invention means are provided for arresting the drift so as to stabilise the display. Figure 3 is similar to Figure 1 and may represent conditions at an instant at which it is decided to stabilise the display. Figure 4 shows the display stabilised by shifting the display at the equivalent speed but in a direction opposite to that in which the aircraft is tracking. It will be understood that the shift is applied progressively and that eventually, in a time determined by the ratio of the radii of the two circles and by the speed of the craft, the display will pass outside the area scanned by the radio beam and suffer eclipse.

In navigating apparatus in accordance with the invention means are provided for applying coordinate shift voltages or currents varying progressively at a rate dependent on the ground speed of the craft to the beam deflecting members of the cathode ray tube so as to oppose the drift and stabilise the display. Each of said shift voltages or currents may be derived by addition of separate voltages or currents representing by their rate of variation the corresponding coordinate of the airspeed of the craft and the corresponding coordinate of the wind speed. That voltage which represents by its rate of variation a coordinate of the airspeed of the craft is derived from a potentiometer driven from the Northings or Eastings shaft of an air mileage unit. The other voltage which represents by its rate of variation a coordinate of the wind speed may be derived from a potentiometer driven at a predetermined constant speed, the rate of voltage variation being set manually by a control which determines the range of said variation. This constant speed potentiometer is advantageously driven by a ratchet motor impulsed by a relay controlled by a valve oscillator.

Preferably the shift voltages control a waiting potential maintained on beam deflecting electrodes of the cathode ray tube between the time base sweeps, said waiting potential being varied progressively at a rate dependent on the ground speed of the craft.

Figure 5:
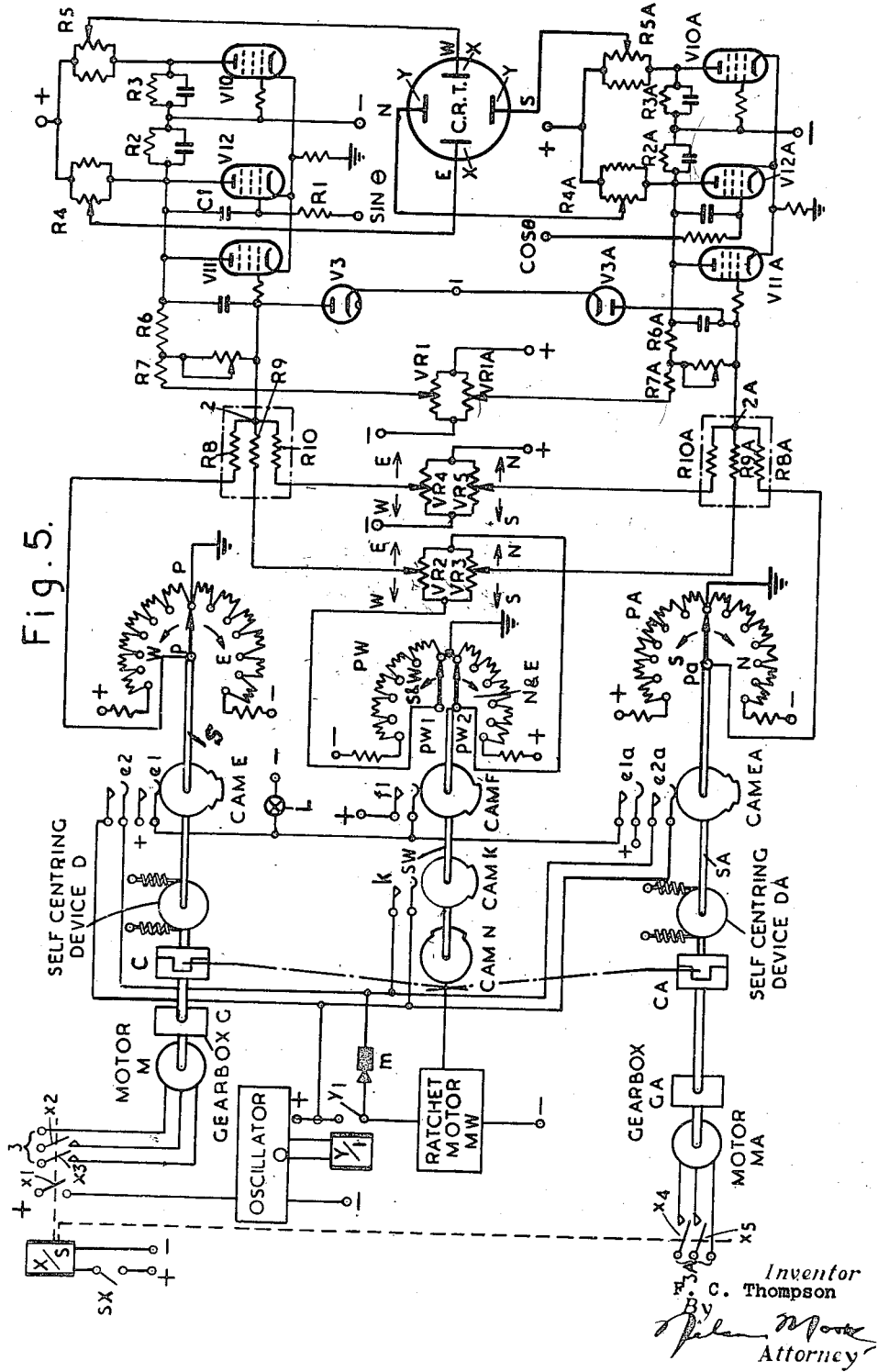
Figure 5 is a schematic diagram of one form of the invention.

Reference is now directed to Fig. 5 of the accompanying drawings which is a composite mechanical and electrical circuit diagram of an embodiment of the invention particularly adapted for aerial navigation.

In Figure 5, CRT represents the cathode ray tube which presents on its screen the map-like picture of terrain being navigated. The tube is provided with radial time base generating circuits comprising sine-cosine potentiometers (not shown) which deliver a voltage proportional to sin θ at terminal marked sin θ and voltage proportional to cos θ at terminal marked cos θ, θ being the instantaneous angular displacement in azimuth of the radio beam from a zero position.

Valve V12 is arranged as a sawtooth generator of the kind employing a negative feed back condenser C1 between the anode and grid and a grid resistance R1 to which a controlling potential is applied. In this case the controlling potential is proportional to sin θ so that the amplitude of the sawtooth varies sinusoidally to provide one quadrature component of the radial time base. V10 is a phase reversing valve which together with V12 constitutes a paraphase amplifier to provide push-pull deflection for the X or east and west plates of the cathode ray tube. Phase reversal is obtained by connecting the grid of V10 to the centre point of a potentiometer R2, R3 which is connected between the anodes of V10 and V12. Manual control of the east to west scanning amplitude is provided by the ganged potentiometers R4, R5 in the anode circuits of the valves V10 and V12. Valve V11 controls the common anode potential of valves V10 and V12 during the waiting period from the end of one scanning stroke to the beginning of the next, being switched off during the scanning stroke by the negative going portion of a suitable controlling waveform applied at terminal 1 and operative upon the grid of V11 through a diode valve V3.

The anode of V11 is connected through a potentiometer network comprising resistances R6, R7, and variable resistance VR1 to a positive or negative potential according to the setting of VR1. During the waiting period between scanning strokes, when the grid of V11 is free from control at terminal 1, the anode potential of V11 (and of V12) adjusts itself to a value which puts zero volts on the grid of V11 from the junction of R6 and R7. The anode potential necessary to do this depends on the setting of VR1 and hence VR1 determines the waiting anode potential of the paraphase amplifiers V10 and V12 and constitutes an east to west centering adjustment. If current is fed in or out of the circuit at terminal 2, the voltage at the junction of R6 and R7, and consequently the anode voltage, has to change to provide an equal and opposite current. Hence by feeding an appropriately increasing current in or out of terminal 2, the waiting potential prior to each successive scan is increased or decreased respectively and the centre of the rotating radial scan shifts progressively east or west at a rate determined by the rate of increase of said current.

An identical circuit arranged to that above described is associated with the Y or north-south plates of the cathode-ray tube. The components are indicated by similar references but with the suffix A, except for the terminal corresponding to sin θ which is marked cos θ in accordance with the applied waveform.

The mechanism and circuits for feeding current in or out of the terminals 2 and 2A at a rate proportional to the east-west and north-south components of the ground speed will now be described.

Use is made of a known navigating instrument which delivers outputs in the forms of two shaft rotations one of which is proportional to distance flown north-south and the other to distance flown east-west, the sense of rotation differentiating between north and south in the one case and east and west in the other.

These rotations are transmitted electrically via the three phase leads 3 and 3A and are repeated by motors M and MA. The motor M relates to movement east-west and is connected through a gearbox G to the shaft S of a potentiometer P, the gear ratio being such that for the maximum distance over which stabilisation is required the wiper arm p of the potentiometer P is moved over its full range of movement from a central position to one or other of its two extremes depending on the sense of rotation of the shaft S. The said maximum distance may, for example, be equivalent to an average flying time of about five minutes. The motor M and gearbox G can be disconnected from the shaft S by a clutch C and a spring-loaded self-centering device D is provided to return the shaft to a central position in the circumstances explained later. A cam E mounted on the shaft S, associated with contacts e1 and e2, is arranged to close contact e1 when the wiper arm p is approaching either of its extreme positions and to close contact e2 when either of said positions is reached.

The motor MA drives a shaft SA identical with the shaft S and associated with similar components. The potentiometers P and PA, which may be termed the air potentiometers, are both connected across a balanced positive and negative D. C. supply and the centre studs are earthed. The wiper arm p is connected through a resistance R8 to the terminal 2 and the wiper arm pa through a resistance R8A to the terminal 2A.

The arrangement is such that increasing positive or negative voltages, corresponding to the instantaneous sense and magnitude of the two rectangular components of the aircraft's course, are applied to the resistances R8 and R8A and by suitably selecting the values of the components an exact correspondence is obtained between the air distance flown at any instant from the commencement of stabilisation and the resultant shift of the display.

In the absence of wind the above described arrangement would acieve complete stabilisation of the display. To correct for wind a third potentiometer PW, which may be termed the wind potentiometer, is provided. This has two wipers pw1 and pw2 driven in opposite directions from the shaft SW over respective halves of the resistance element which also is connected across a balanced positive and negative supply. The shaft SW is driven by a ratchet motor MW impulsed by relay contact y1 of a relay Y/1 in the circuit of a valve oscillator O. The oscillator frequency is constant so that the shaft SW rotates at a constant speed and linearly increasing voltages of opposite sign representing wind speed south or west and north or east are picked up by the wipers pw1 and pw2. Those voltages are fed to each end of two parallel connected variable resistances VR2 and VR3 the contact arms of which are connected to resistances R9 and R9A respectively.

Except when the contact arms of the variable resistances VR2 and VR3 are in a central position, linearly increasing voltages appear at the contacts and give rise to currents in the resistances R9 and R9A, the sense of these currents and their rate of increase being determined by the setting of said variable resistances VR2 and VR3, the controls of which are calibrated in terms of wind speed east-west and north-south respectively from zero (in the central position) to a maximum (at each extreme position). The maximum wind speed capable of being accommodated is predetermined by the circuit constants and the speed of the motor MW.

The wind potentiometer PW is similar to a uniselector switch used in automatic telephony so that when each of its wiper arms has reached its last contact stud it is homed by continuing to rotate in the same direction to complete a revolution. Homing is effected rapidly by a self-interrupting contact $m$ associated with the ratchet motor MW which takes over the relatively slow speed impulsing contact $y1$ when its circuit is completed by any one of three parallel connected contacts $e2$, $e2a$, or $k$. Contacts $e2$ and $e2a$ have already been described. Contact $k$ is closed by a cam K on the shaft SW when the wipers $pw1$ and $pw2$ reach their last contacts and is opened by the cam when the wipers have homed to their central position. There is also a cam F on the shaft SW which closes a contact $f1$ and completes a circuit for the warning lamp L when the wipers $pw1$ and $pw2$ approach the end of their run—and a cam N which releases the clutches C and CA during the homing period.

Distinct from the three potentiometers which automatically provide linearly increasing potentials for stabilising the display, means are provided for applying a manual shift. This consists of variable resistances VR4 and VR5 connected across the positive and negative supply. Appropriate shift voltages are thus obtained from the sliding contacts and are fed in to the time base circuits at terminals 2 and 2A through resistances R10 and R10A.

After having set the calibrated controls of the variable resistances VR2 and VR3 in accordance with the wind obtained from meteorological or other sources a stabilising run is initiated by closing a switch SX. This energises relay X/S which closes contact $x1$ and starts the oscillator O. Relay Y/1 in the circuit of the oscillator thus impulses contact $y1$ and the ratchet motor MW operates the wind potentiometer PW at constant speed. At the same time contacts $x2$, $x3$, $x4$, and $x5$ close the circuits of the motors M and MA and, since the clutches C and CA are normally engaged, the potentiometers are driven at a speed and in a direction dependent on the north-south and east-west coordinates of the airspeed and course of the aircraft. When any one of the potentiometers nears the end of its run a warning lamp L is lit by closure of contact $e1$ by cam E, contact $e1a$ by cam EA or contact $f1$ by cam F. For a five minute stabilising run the operator would then have about 30 seconds (depending upon the air and wind speeds) to complete his observations of the stabilised display before one of the potentiometers completes its run. If the wiper of the air potentiometer P is the first to reach the end of its travel in either direction a second step on cam E closes contact $e2$ and completes the homing circuit for ratchet motor MW through its self interrupting contact $m$. Wind potentiometer PW thus rapidly homes and when its wipers reach their last contacts cam N releases clutches C and CA and the wipers of the air potentiometers P and PA are returned to the central position by the spring-loaded devices D and DA. This causes contact $e2$ to open but the homing circuit is by this time held at contact $k$ which is closed by cam K. Should the wind potentiometer PW be the first to come to the end of its travel, cam K closes contact $k$ to complete the homing circuit and cam N releases the clutches C and CA. As soon as the homing run is completed and all the wipers are centralised, cam N re-engages the clutches C and CA, cam K allows contact $k$ to open and, unless switch SX is opened, a further stabilising run commences.

In using the invention to measure wind, the calibrated controls of the variable resistances VR2 and VR3 are either set to zero or preferably to what are believed to be the north-south and east-west coordinates of the wind. An easily identifiable feature on the display is then selected and the manual shift controls VR4 and VR5 adjusted to bring this feature to the centre of the screen. The display is then stabilised, unless the wind setting is incorrect in which case the picture will drift. By resetting the display at the end of the stabilising run or by making continual adjustments during the run so as to maintain the selected feature at the centre of the screen, the true coordinates of wind will have been set up on the controls of variable resistances VR2 and VR3.

I claim:

1. In a plan position indicator located aboard an aircraft, a cathode ray tube, beam deflecting means for establishing a rotating field in said tube to thereby rotate the beam, said beam deflecting means including a circuit for establishing a plurality of voltages out of phase with each other and a plurality of beam deflecting elements positioned around the beam, there being one element for each of said voltages, said elements being angularly separated around the beam at angles substantially equal to the phase angles between the respective voltages, means for modifying each of said voltages in accordance with that respective component of the distance that the aircraft travels from a given point that are respectively complementary to the angles of said elements, a source for producing a constantly changing potential, and adjustable means for applying determinable percentages and polarities of said potential to said voltages to thereby modify the latter; said source for producing a constantly changing potential comprising all of the following parts, a tapped resistor, a contact arm for selecting the desired tap, means connected to said resistor to effect changes in the potential when the tap is changed, a ratchet motor for driving said arm to change taps in sequence, a relay in the input of the ratchet motor, and an oscillator for controlling the relay to cause the latter to intermittently close at the frequency of the oscillator.

2. Navigating apparatus for an aircraft comprising a cathode ray tube operating as a radar plan position indicator, said tube including beam deflecting means, an air-mileage indicating device, a first pair of potentiometers controlled by means of said device to yield potentials proportional to the air displacements of said aircraft in two horizontal directions, a second pair of potentiometers driven at a predetermined speed to yield potentials proportional to the wind drifts of the said aircraft in two horizontal directions, and means for applying signals derived from all said potentials to said beam deflecting means in said cathode ray tube to modify the drift of the display thereon.

3. The device of claim 2 in which said air-mileage indicating device comprises two rotary elements one of which varies one of the potentiometers of said first pair and the other of which varies the other of the potentiometers of said first pair, said rotary elements including means to respectively rotate them proportional to the distances travelled by the aircraft in the two horizontal first-recited directions.

4. In a plan position indicator located aboard an aircraft, a cathode ray tube, said tube including four beam deflecting elements located around the beam and ninety degrees apart, a first circuit for energizing two opposite elements with a sawtooth potential, means for influencing the sawtooth potential in accordance with an alternating current potential, a second circuit for energizing the remaining two elements with a sawtooth potential, means for influencing this sawtooth potential in accordance with an alternating current potential equal in amplitude to the first alternating current potential and ninety degrees out of phase therewith, a first mileage measuring device for measuring the distance travelled by the aircraft with respect to the ambient air in a first direction; a third circuit for applying a direct current bias to said first circuit in accordance with the distance indicated by said mileage measuring device, a second mileage measuring device for measuring the distance travelled by the aircraft with respect to the ambient air in a second direction which is perpendicular to said first direction, a fourth circuit for applying a direct current bias to said second circuit in accordance with the distance indicated by said second mileage measuring device, a first source of constantly changing potential, a second source of constantly changing potential which varies in magnitude at the same rate as but in opposite sense to the variations of the first source, a potentiometer connected across said first and second sources and including an adjustable element for varying the magnitude and polarity of the potential of said adjustable element, a circuit connecting said adjustable element to said first circuit to thereby deflect the cathode ray in accordance with the movements of said adjustable element, a second potentiometer connected across said first and second source and including a second adjustable element for varying the magnitude and polarity of the potential of said second adjustable element, and a circuit connecting said second adjustable element to said second circuit to thereby deflect the cathode ray in accordance with the movements of said second adjustable element.

5. In a plan position indicator for use aboard aircraft, a cathode ray tube having a plurality of deflecting elements for shifting the cathode ray; means for applying a waiting potential to said elements; means for inhibiting the application of said waiting potential to said elements during time base sweeps; said means for applying a waiting potential comprising an air mileage indicator device, a plurality of potentiometers controlled by said device to yield potentials proportional to the air displacements of said aircraft in directions respectively represented by said elements, a pair of potentiometers driven at a predetermined speed to yield potentials proportional to the respective wind drifts of the said aircraft in said directions; circuits for combining in respect of each of said directions the potentials proportional to the air displacements and wind drifts and circuits for applying the combined potentials to said elements respectively; and a sweep generator for superimposing on said potentials additional potentials which if taken alone would produce a radial scan which rotates.

FREDERICK CHARLES THOMPSON.

REFERENCES CITED

The following references are of record in the file of this patent:

UNITED STATES PATENTS

| Number | Name | Date |
|---|---|---|
| 2,396,112 | Morgan | Mar. 5, 1946 |
| 2,406,751 | Emerson | Sept. 3, 1946 |
| 2,416,591 | Muntz et al. | Feb. 25, 1947 |
| 2,421,747 | Engelhardt | June 10, 1947 |
| 2,480,208 | Alvarez | Aug. 30, 1949 |